July 25, 1939.  H. ROTHE ET AL  2,167,033
DEMODULATING DEVICE
Filed Jan. 11, 1935  2 Sheets-Sheet 1

INVENTORS
HORST ROTHE
RUDOLF URTEL
BY
ATTORNEY

July 25, 1939.　　　H. ROTHE ET AL　　　2,167,033
DEMODULATING DEVICE
Filed Jan. 11, 1935　　　2 Sheets-Sheet 2

INVENTORS
HORST ROTHE
RUDOLF URTEL
BY
ATTORNEY

Patented July 25, 1939

2,167,033

UNITED STATES PATENT OFFICE 2,167,033

DEMODULATING DEVICE

Horst Rothe and Rudolf Urtel, Berlin, Germany, assignors to Telefunken Gesellschaft für Drahtlose Telegraphie m. b. H., Berlin, Germany, a corporation of Germany Application January 11, 1935, Serial No. 1,350
In Germany January 27, 1934

5 Claims. (Cl. 250—27)

Figure 1:
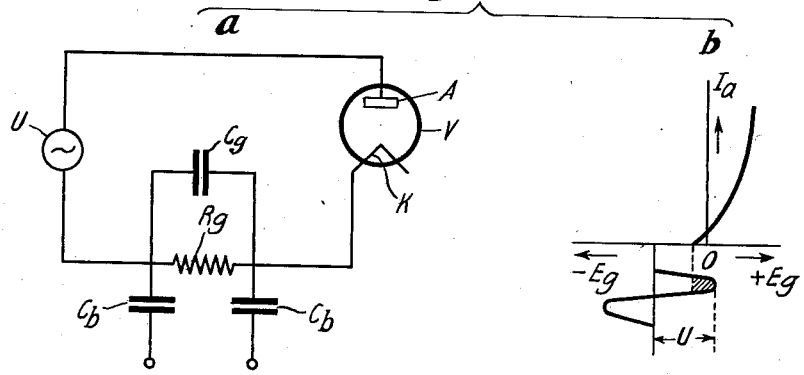
Figure 2:
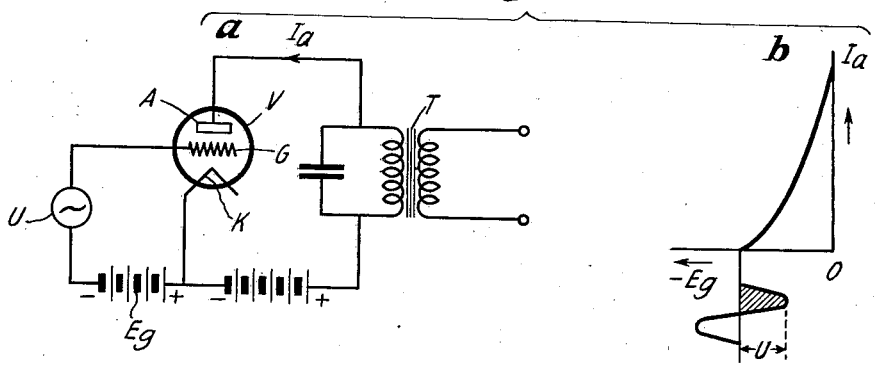
Figure 3:
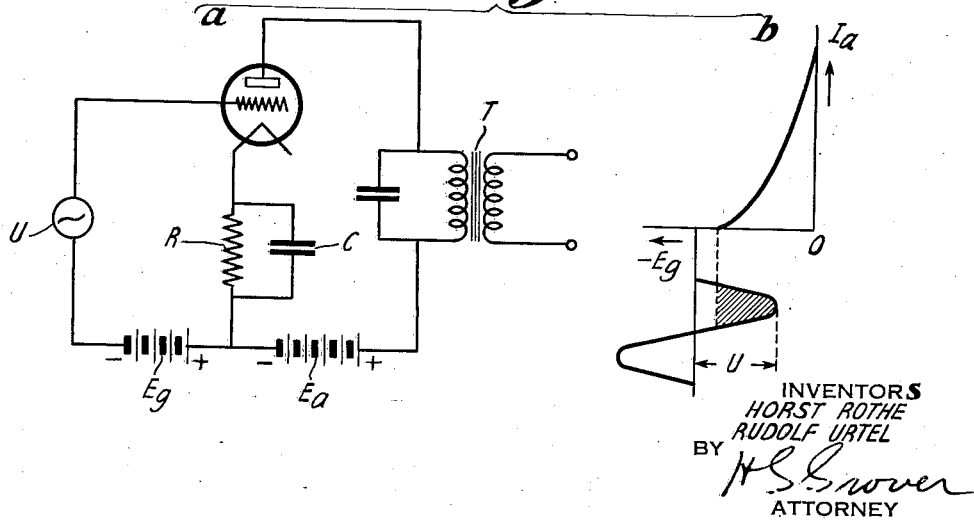
Figure 4:
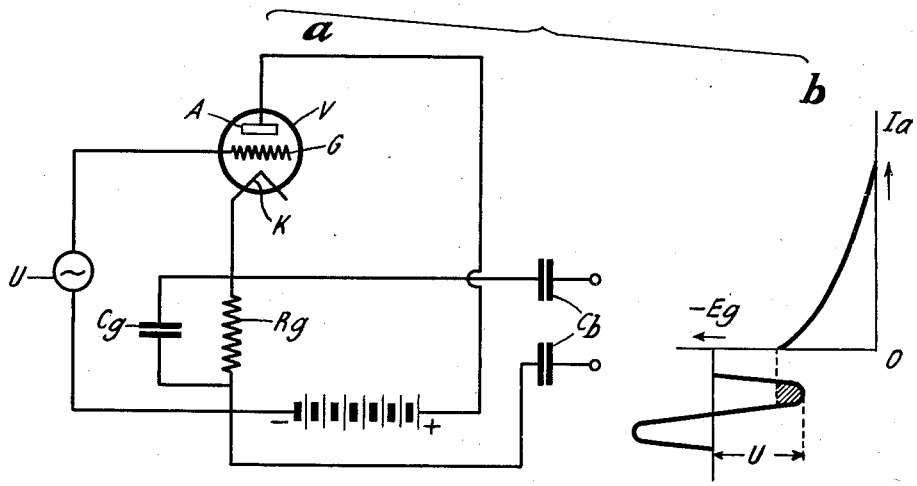
Figure 5:
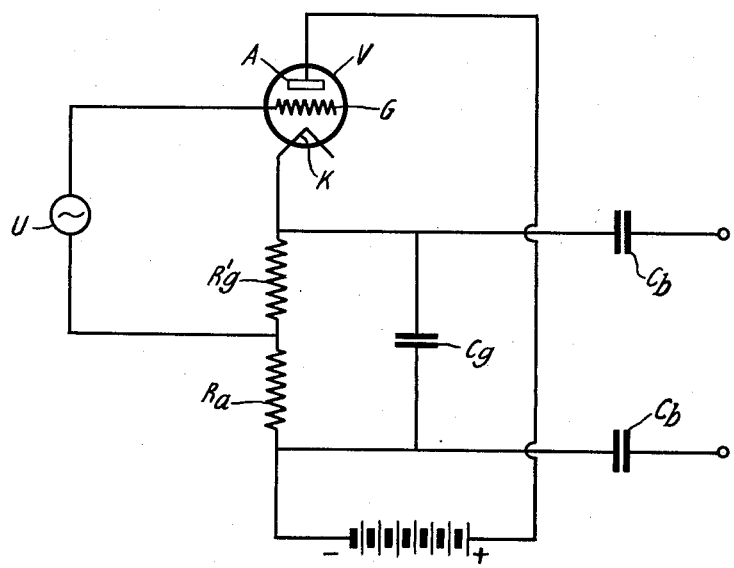

For the rectification of alternating voltages by means of discharge tubes hitherto two principal circuits are known: the grid detection and the anode detection circuits. For a better understanding of these systems and the invention, reference is made to the accompanying drawings, in which:

Fig. 1, part $a$, is a schematic circuit diagram of a diode detector,

Fig. 1, part $b$, shows the relationship between applied voltage and current in the detector of Fig. 1, part $a$, Fig. 2, part $a$, is a circuit diagram of a three electrode tube operating as an anode current detector;

Fig. 2, part $b$, shows the relationship between the grid voltage and plate current of the tube in Fig. 2, part $a$, Fig. 3, part $a$, is a circuit diagram of a three electrode tube detector arranged for automatic change of the grid voltage;

Fig. 3, part $b$, shows the characteristic curve of the tube of Fig. 3, part $a$, Fig. 4, part $a$, is a circuit diagram of a detecting device arranged according to our invention, Fig. 4, part $b$, is a characteristic curve of the detector of Fig. 4, part $a$, and, Fig. 5 is a circuit diagram of a detector arranged according to another embodiment of the invention.

In the grid detection method as shown in Figure 1, part $a$, the alternating voltage source U is connected to the incandescent cathode K of a two electrode tube V across an ohmic resistor $R_g$ having a condenser $C_g$ placed in parallel thereto, and it is further connected to an anode A opposite the said cathode of this tube V. During the positive alternations of the alternating voltage (see Figure 1, part $b$) electrons can reach the anode, causing such a high charge of the condenser $C_g$ that the number of electrons reaching the anode in the state of equilibrium during the positive half wave, is equal to the number passing during one cycle through the parallel resistor $R_g$. The magnitude of this charge varies with the square of the signal voltage for an alternating voltage of less than about 0.8 volt, for higher voltages, however, it varies linearly with the amplitude. For this larger amplitude the detection thus takes place almost without distortion. Principally, the alternating voltage source U must always furnish the power necessary for charging the condenser $C_g$. This required amount of power can be the cause of distortion especially in the case of modulated alternating voltages. In this circuit the detected voltage is tapped from the resistor $R_g$ across a suitable coupling element such as the condensers $C_b$. The grid circuit detection described of a two electrode tube is usually carried out as is known by means of the grid-cathode path of a three-electrode tube, in order to be able to subsequently amplify the modulation frequency in the same tube.

Another detection circuit, the anode detection (also termed directional amplifier) is shown in Figure 2, part $a$, in which there is used a discharge tube V having three electrodes namely, cathode K, control grid G and anode A. The control grid G receives hereby a negative bias $E_g$ of such value that the working point lies on the lower bend of the anode current characteristic (see Figure 2, part $b$). This direct voltage will be superposed on the alternating voltage U. When the anode current-characteristic is formed in accordance with the law of space charge $I_a = f(E_g)$, the anode direct current $I_a$ produced by the detecting action is approximately proportional to the square of the high frequency alternating voltage U. For alternating voltage amplitudes smaller than the grid bias $E_g$, the control takes place hereby without requiring energy, however, the quadratic course of the rectifying action causes considerable distortion. For an alternating voltage amplitude U larger than $E_g$ there passes during the positive voltage peaks, furthermore, an additional grid current which causes an additional distortion and damping of the grid circuit.

In order to avoid this latter distortion it has been proposed (as in German Patent Number 560,028) as shown in Figure 3, to insert in the common cathode connection of the grid and anode circuit, a resistor R having a large capacity C placed in parallel thereto. The anode direct current $I_a$ produces through this resistor R a voltage drop of such direction that the grid receives an additional negative bias. Upon an increase of the alternating voltage this bias also increases, so that the limit of the commencing excess control will be displaced towards essentially greater alternating voltage amplitudes. In detecting modulated alternating voltages the bridging condenser C must be chosen so large that the alternating component of the modulation frequency flowing in the anode circuit does not produce a notable voltage drop through C and R. Thus it is only the purpose of these elements to furnish detection by the displacement of the grid potential without otherwise participating in the detection performance in any way. The detected voltage, for instance at the detection of modulated high frequency, the voltage of the modulation frequency is taken, in both circuits Figures 2 and 3, from an impedance in the anode circuit for instance, a transformer T. Both circuits have the disadvantage that the detecting effect takes a quadratic course or in other words is square law up to amplitudes of about 8 to 10 volts. Up to these voltages which are of great importance especially for radio-reception, these two circuits therefore, cause considerable and, moreover, essentially greater distortion than the aforementioned grid detection.

Hence, the grid detection produces a linear detection effect in case of voltages of more than 0.8 volt. However, it has the disadvantage that the alternating voltage source must furnish power. The anode detection on the contrary, produces a quadratic or square law detection effect in the practically important voltage range. However, it has the advantage that the detection takes place without requiring power. This invention aims at the combination of the advantages of both circuits by avoiding the designated disadvantages.

In accordance with the invention a capacitively bridged resistor is placed in the cathode lead common to the grid and anode circuits, and the condenser is so dimensioned that its impedance is considerably lower for the high frequency, and for the modulation frequency it is greater than the resistor which is bridged therewith.

The invention is illustrated in Figures 4 and 5. In Figure 4 the alternating voltage source U is connected to the grid G and cathode K of a discharge tube V across the resistor $R_g$ to which the condenser $C_g$ is connected in parallel which at the same time is also in the anode circuit. Hence the anode current produces a voltage drop through the resistor $R_g$ whereby the grid becomes negatively biased; in the state of equilibrium an anode direct current is established having just the value necessary to produce across the resistor $R_g$ the required grid potential. Upon the super-position of an alternating voltage, an additional charging of the condenser $C_g$ takes place which exactly as in the above described grid detection circuit, increases for amplitudes up to about 0.8 volt according to the square law, with an increase of the said alternating voltage, and for greater amplitudes it increases linearly therewith. The charging of the condenser is effected hereby by means of the current impulses of the plate circuit during the positive portion of the voltage wave, while currents do not pass through the grid circuit, so that the rectification takes place without power. The value of $R_g$ and $C_g$ must be approximately chosen as in the case of the grid detection circuit, i. e., the bridging condenser must not have an appreciable impedance for the alternating voltage to be rectified. However, as regards the modulation frequency it must have a substantially high impedance. The impedance of the condenser $C_g$ hence should be essentially lower as regards high frequency and for the modulation frequency it must be higher than the resistor $R_g$. Thus it must be dimensioned entirely different from the condenser lying at the same place in the circuit according to Figure 3; this condenser as will be noted, is to have a possibly small impedance also for the modulation frequency. The detected alternating voltage in this case as well as in the case of the grid detection circuit of Fig. 1, part $a$, is directly tapped across the resistor $R_g$ for instance through the coupling condensers $C_b$.

From the functioning of the circuit according to Figure 4 it can be readily seen that at maximum signal voltage the detected voltage can be equal to the amplitude of the alternating voltage, i. e., amplification does not take place within the tube. However, an additional amplification can be obtained according to Figure 5 in which the resistor $R_g$ is divided into two portions $R'_g$ and $R_a$, whereby only the portion $R'_g$ is placed simultaneously in the anode and grid circuits. The detected voltage can then be a multiple of the alternating grid potential. It is again directly tapped at the two outer terminals not connected to each other of the two resistances $R'_g$ and $R_a$ for instance, by means of a capacitive coupling.

Having described our invention what we claim as new and desire to secure by Letters Patent is:

1. In combination, an electron discharge tube detector having a cathode, a grid and an anode, a grid circuit connecting said grid and cathode, an anode circuit connecting said anode and cathode, means for impressing modulated radio signal voltage variations on said grid, a resistor common to said grid and anode circuits, and a single condenser having its opposite sides directly connected to the ends of said resistor, said condenser having a lower impedance than said resistor to radio frequency currents but a substantially higher impedance than said resistor to currents of substantially the entire range of the modulation frequencies.

2. In combination, an electron discharge detector tube having a cathode, grid and anode, a grid circuit connecting said grid and cathode, an anode circuit connecting said anode and cathode and including a resistor, said grid circuit being directly connected to an intermediate point of said resistor, a condenser shunted across said resistor, a pair of output terminals and two condensers having one side directly connected to one of said output terminals and the other side to the respective ends of said resistor.

3. Means for detecting modulated radio frequency signal currents generated by a source, comprising the combination of a vacuum tube having a cathode, grid and plate, a source of steady positive potential, a resistor having one end connected to said cathode and its other end to the negative terminal of said potential source, a circuit connecting the positive terminal of said potential source and plate, a condenser shunted across said resistor and having a lower impedance than said resistor to radio frequency currents but a substantially higher impedance to currents of the modulation frequency, a lead connecting one terminal of said source of signal currents to said grid and a lead directly connected between the other terminal of said source of signal currents and an intermediate point of said resistor, said last named lead forming the sole connection between said other terminal and said cathode.

4. In a degenerative plate circuit detector network, an electron discharge tube provided with a signal input circuit and a plate circuit, a biasing resistor connected to the cathode of the tube, said resistor being common to the input and plate circuits of said detector tube whereby an audio voltage due to current flow in the output circuit is developed thereacross which varies directly in amplitude with the impressed waves, connections between the input electrodes of the detector tube and the biasing resistor whereby the developed voltage is fed to the input electrodes in degenerative phase, said common resistor in the cathode circuit being substantially unbypassed for audio voltage, and a pair of output terminals connected across said biasing resistor for leading off the detected audio voltage.

5. In a degenerative plate circuit detector network, an electron discharge tube provided with a signal input circuit and a plate circuit, a biasing resistor included in both the input and plate circuits of said detector tube, purely capacitive means shunting said resistor having a high impedance to substantially the entire range of the modulation frequencies and a low impedance to the carrier frequency, whereby an audio voltage due to current flow in the output circuit is developed across said resistor, and connections between the input electrodes of the detector tube and the biasing resistor whereby the developed voltage is fed to the input electrodes in degenerative phase.

HORST ROTHE.
RUDOLF URTEL.